US010133572B2

(12) United States Patent
Gruber et al.

(10) Patent No.: US 10,133,572 B2
(45) Date of Patent: Nov. 20, 2018

(54) TECHNIQUES FOR SERIALIZED EXECUTION IN A SIMD PROCESSING SYSTEM

(71) Applicant: QUALCOMM Incorporated, San Diego, CA (US)

(72) Inventors: Andrew Evan Gruber, Arlington, MA (US); Lin Chen, San Diego, CA (US); Yun Du, San Diego, CA (US); Alexei Vladimirovich Bourd, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 14/268,215

(22) Filed: May 2, 2014

(65) Prior Publication Data
US 2015/0317157 A1 Nov. 5, 2015

(51) Int. Cl.
G06F 9/30 (2018.01)
G06F 9/38 (2018.01)

(52) U.S. Cl.
CPC ........ *G06F 9/3009* (2013.01); *G06F 9/30145* (2013.01); *G06F 9/3851* (2013.01); *G06F 9/3887* (2013.01)

(58) Field of Classification Search
CPC .................................................. G06F 9/3887
See application file for complete search history.

(56) References Cited

U.S. PATENT DOCUMENTS

| 6,947,047 | B1 | 9/2005 | Moy et al. |
| 7,634,637 | B1 | 12/2009 | Lindholm et al. |
| 7,761,697 | B1* | 7/2010 | Coon ...................... G06F 9/322 |
| | | | 712/233 |
| 8,176,265 | B2 | 5/2012 | Coon et al. |
| 8,447,953 | B2 | 5/2013 | Wildman |
| 8,489,693 | B2 | 7/2013 | Eibach et al. |
| 8,612,955 | B2 | 12/2013 | Oskin et al. |
| 2005/0268075 | A1* | 12/2005 | Caprioli ................ G06F 9/3848 |
| | | | 712/239 |
| 2009/0240931 | A1* | 9/2009 | Coon .................. G06F 9/30054 |
| | | | 712/234 |
| 2011/0078690 | A1 | 3/2011 | Fahs et al. |
| 2013/0212364 | A1 | 8/2013 | Fetterman et al. |
| 2014/0047223 | A1 | 2/2014 | Chen et al. |
| 2014/0075160 | A1 | 3/2014 | Jones |
| 2014/0075165 | A1 | 3/2014 | Chen |

FOREIGN PATENT DOCUMENTS

CN 101124569 A 2/2008

OTHER PUBLICATIONS

X86 assemply dump sample, Dec. 19, 2003, 22 pages, [retrieved from the internet on Jul. 31, 2017], retrieved from URL <www.lrdev.com/lr/x86/samp1.html>.*

(Continued)

*Primary Examiner* — Jyoti Mehta
(74) *Attorney, Agent, or Firm* — Shumaker & Sieffert, P.A.

(57) ABSTRACT

A SIMD processor may be configured to determine one or more active threads from a plurality of threads, select one active thread from the one or more active threads, and perform a divergent operation on the selected active thread. The divergent operation may be a serial operation.

8 Claims, 5 Drawing Sheets

(56) References Cited

OTHER PUBLICATIONS

X86 registers, Jan. 15, 2005, 3 pages, [retrieved from the internet on Aug. 3, 2017], retrieved from URL <www.eecg.toronto.edu/~amza/www.mindsec.com/files/x86regs.html>.*
For loops, Jul. 17, 2009, 3 pages, [retrieved from the internet on Jan. 29, 2018], retrieved from URL <www.javamex.com/tutorials/java/for_loop.shtml>.*
Function 2, Nov. 10, 2008, 8 pages, [retrieved from the internet on Jan. 29, 2018], retrieved from URL <ux.brookdalecc.edu/fac/engtech/andy/elt242/handouts/function_2.pdf>.*
Shinwano, Question about divergence and loops, Nov. 21, 2010, 3 pages, [retrieved from the internet on Jan. 31, 2018], retrieved from URL <devtalk.nvidia.com/default/topic/481006/question-about-divergence-and-loops/>.*
Gordon, Going from C to MIPS Assembly, Sep. 2000, version 1.1, 5 pages, [retrieved from the internet on Jan. 31, 2018], retrieved from URL <courses.cs.washington.edu/courses/cse378/00au/ctomips2.pdf>.*
International Search Report and Written Opinion from International Application No. PCT/US2015/025362 dated Jun. 30, 2015, 9 pp.
International Preliminary Report on Patentability from International Application No. PCT/US2015/025362, dated Sep. 6, 2016, 7 pp.

\* cited by examiner

TECHNIQUES FOR SERIALIZED EXECUTION IN A SIMD PROCESSING SYSTEM

TECHNICAL FIELD

The disclosure relates to multi-threaded processing and, more particularly, to techniques for serialized execution in a single instruction multiple data (SIMD) processing system.

BACKGROUND

A single instruction, multiple data (SIMD) processing system is a class of parallel computing systems that includes multiple processing elements which execute the same instruction on multiple pieces of data. A SIMD system may be a standalone computer or a sub-system of a computing system. For example, one or more SIMD execution units may be used in a graphics processing unit (GPU) to implement a programmable shading unit that supports programmable shading.

A SIMD processing system allows multiple threads of execution for a program to execute synchronously on the multiple processing elements in a parallel manner, thereby increasing the throughput for programs where the same set of operations needs to be performed on multiple pieces of data. In some situations it may be desirable to perform one or more threads in serial. For instance, in a situation where the output of one thread is needed as an input for one or more other threads. Executing serial operations on a SIMD can be resource intensive and inefficient.

SUMMARY

This disclosure describes techniques for performing a serialized operation in a SIMD processing system. In examples of the disclosure, a hardware-executed instruction is proposed that selects one thread of a plurality of active threads to execute a serial instruction. The instruction may select a thread without checking thread IDs or using instructions to lock a shared variable. As such, serial operations may be performed quickly and efficiently, with minimal impact to system resources.

In one example of the disclosure, a multi-threaded processor configured to perform divergent operations comprises a control unit configured to determine one or more active threads from a plurality of threads, and to select one active thread from the one or more active threads, and a plurality of processing elements, wherein one processing element of the plurality of processing elements associated with the selected active thread is configured to perform a divergent operation.

In another example of the disclosure, an apparatus configured to perform divergent operations on a multi-threaded processor comprises means for determining one or more active threads from a plurality of threads, means for selecting one active thread from the one or more active threads, and means for performing a divergent operation on the selected active thread.

In another example of the disclosure, an apparatus configured to perform divergent operations comprises a multi-threaded processor comprising a control unit configured to determine one or more active threads from a plurality of threads, and to select one active thread from the one or more active threads, and a plurality of processing elements, wherein one processing element of the plurality of processing elements associated with the selected active thread is configured to perform a divergent operation.

In another example of the disclosure, a method of performing divergent operations on a multi-threaded processor comprises determining one or more active threads from a plurality of threads, selecting one active thread from the one or more active threads, and performing a divergent operation on the selected active thread.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure describes techniques for performing serial operations in a SIMD processing system (e.g., a GPU). Conventional techniques for performing serial operations in SIMD processing systems can be resource intensive and inefficient. This disclosure proposes an instruction (e.g., executed by hardware in a SIMD processor) that selects one active thread of a plurality of active threads to perform the serial operation, without looping over all inactive threads. This may lead to more efficient serial operation in a SIMD processing system.

Figure 1:
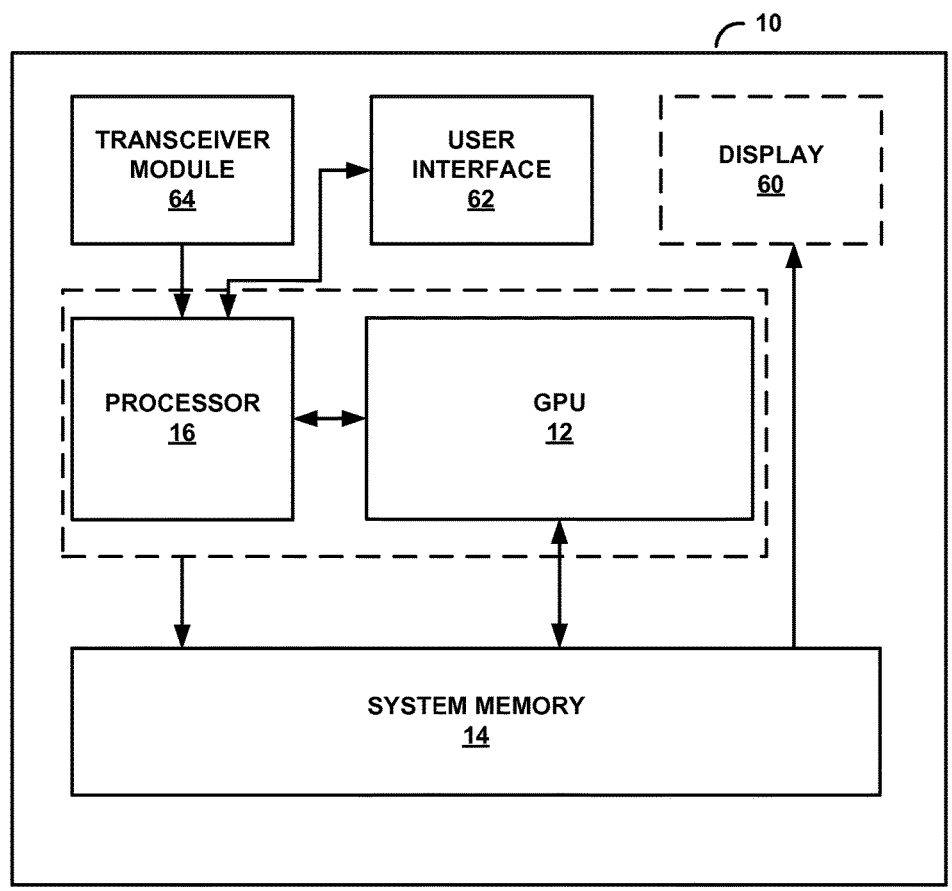
FIG. 1 is a block diagram illustrating a device that may be configured to implement the techniques of this disclosure.

FIG. 1 is a block diagram illustrating an example device that may implement the techniques of this disclosure for serialized execution in a SIMD processing system. FIG. 1 illustrates device 10 that includes GPU 12, system memory 14, and processor 16, which may be a central processing unit (CPU). Examples of device 10 include, but are not limited to, video devices such as media players, set-top boxes, wireless handsets such as mobile telephones, personal digital assistants (PDAs), desktop computers, laptop computers, gaming consoles, video conferencing units, tablet computing devices, and the like. Device 10 may include components in addition to those illustrated in FIG. 1.

System memory 14 may be considered as the memory for device 10. System memory 14 may comprise one or more computer-readable storage media. Examples of system memory 14 include, but are not limited to, a random access memory (RAM), an electrically erasable programmable read-only memory (EEPROM), flash memory, or any other medium that can be used to carry or store desired program code in the form of instructions and/or data structures and that can be accessed by a computer or a processor.

In some aspects, system memory 14 may include instructions that cause processor 16 and/or GPU 12 to perform the functions ascribed to processor 16 and GPU 12 in this disclosure. Accordingly, system memory 14 may be a computer-readable storage medium having instructions stored thereon that, when executed, cause one or more processors (e.g., processor 16 and GPU 12) to perform various functions.

System memory 14 may, in some examples, be considered as a non-transitory storage medium. The term "non-transitory" may indicate that the storage medium is not embodied in a carrier wave or a propagated signal. However, the term "non-transitory" should not be interpreted to mean that system memory 14 is non-movable or that its contents are static. As one example, system memory 14 may be removed from device 10, and moved to another device. As another example, memory, substantially similar to system memory 14, may be inserted into device 10. In certain examples, a non-transitory storage medium may store data that can, over time, change (e.g., in RAM).

In some examples, such as examples where device 10 is a wireless handset communication device, processor 16 and GPU 12 may be formed in an integrated circuit (IC). For example, the IC may be considered as a processing chip within a chip package. In some examples, processor 16 and GPU 12 may be housed in different integrated circuits (i.e., different chip packages) such as examples where device 10 is a desktop or laptop computer. However, it may be possible that processor 16 and GPU 12 are housed in different integrated circuits in examples where device 10 is a wireless handset communication device.

Examples of processor 16 and GPU 12 include, but are not limited to, a digital signal processor (DSP), general purpose microprocessor, application specific integrated circuit (ASIC), field programmable logic array (FPGA), or other equivalent integrated or discrete logic circuitry. In some examples, GPU 12 may be specialized hardware that includes integrated and/or discrete logic circuitry that provides GPU 12 with massive parallel processing capabilities suitable for graphics processing. In some instances, GPU 12 may also include general purpose processing capabilities, and may be referred to as a general purpose GPU (GPGPU) when implementing general purpose processing tasks (i.e., non-graphics related tasks).

Processor 16 may execute various types of applications. Examples of the applications include web browsers, e-mail applications, spreadsheets, video games, or other applications that generate viewable objects for display. Instructions for execution of the one or more applications may be stored within system memory 14. Processor 16 may transmit graphics data of the viewable objects to GPU 12 for further processing.

For instance, processor 16 may offload processing tasks to GPU 12, such as tasks that require massive parallel operations. As one example, graphics processing requires massive parallel operations, and processor 16 may offload such graphics processing tasks to GPU 12. Processor 16 may communicate with GPU 12 in accordance with a particular application processing interface (API). Examples of such APIs include the DirectX® API by Microsoft®, the OpenGL® API by the Khronos group, and the OpenCL™ API; however, aspects of this disclosure are not limited to the DirectX, the OpenGL, or the OpenCL APIs, and may be extended to other types of APIs. Moreover, the techniques described in this disclosure are not required to function in accordance with an API, and processor 16 and GPU 12 may utilize any technique for communication.

To perform graphics operations, GPU 12 may implement a graphics processing pipeline. The graphics processing pipeline includes performing functions as defined by software or firmware executing on GPU 12 and performing functions by fixed-function units that are hardwired to perform very specific functions. The software or firmware executing on the GPU 12 may be referred to as shader programs (or simply shaders), and the shader programs may execute on one or more shader cores of GPU 12. Shader programs provide users with functional flexibility because a user can design the shader program to perform desired tasks in any conceivable manner. The fixed-function units, however, are hardwired for the manner in which the fixed-function units perform tasks. Accordingly, the fixed-function units may not provide much functional flexibility.

For example, processor 16 may execute an application, such as a video game, and processor 16 may generate graphics data as part of the execution. Processor 16 may output the graphics data for processing by GPU 12. GPU 12 may then process the graphics data in the graphics pipeline. In some examples, to process the graphic data, GPU 12 may need to execute one or more shader programs. For example, the application executing on processor 16 may cause processor 16 to instruct GPU 12 to retrieve a shader program from system memory 14 and instruct GPU 12 to execute the shader program.

Device 10 may also optionally include display 60, user interface 62, and transceiver module 64. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 62 and display 60 may be external to device 10 in examples where device 10 is a desktop computer. As another example, user interface 62 may be part of display 60 in examples where display 60 is a touch-sensitive or presence-sensitive display of a mobile device.

Examples of user interface 62 include, but are not limited to, a trackball, a mouse, a keyboard, and other types of input devices. User interface 62 may also be a touch screen and may be incorporated as a part of display 60. Transceiver module 64 may include circuitry to allow wireless or wired communication between device 10 and another device or a network. Transceiver module 64 may include modulators, demodulators, amplifiers and other such circuitry for wired or wireless communication. Display 60 may comprise a liquid crystal display (LCD), a cathode ray tube (CRT) display, a plasma display, a touch-sensitive display, a presence-sensitive display, or another type of display device.

As will be explained in more detail below, in accordance with the techniques of the disclosure, GPU 12 may be configured to perform a method of performing divergent operations on a multi-threaded processor. GPU 12 may be configured to determine one or more active threads from a plurality of threads, select one active thread from the one or more active threads, and perform a divergent operation on the selected active thread.

Figure 2:
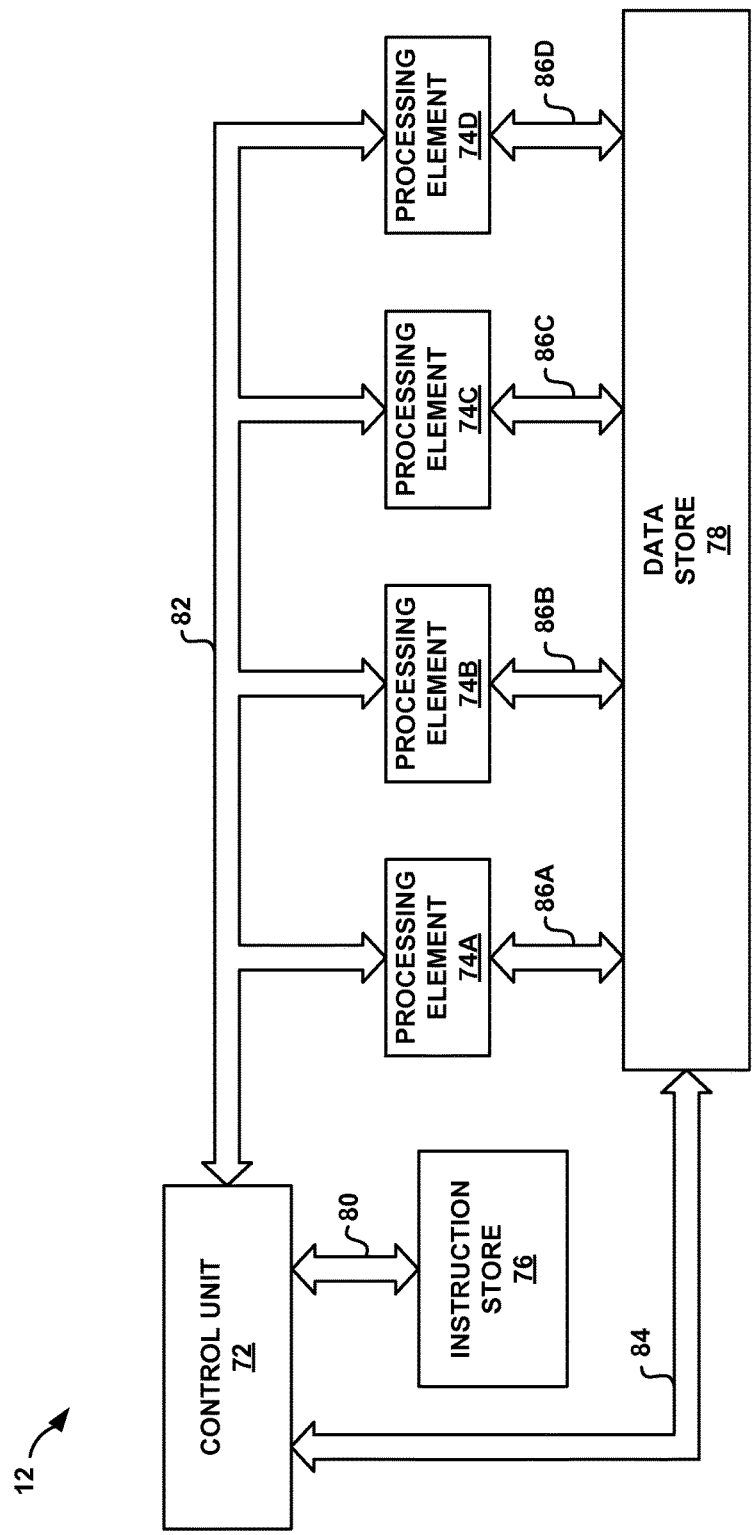
FIG. 2 is a block diagram illustrating an example graphics processing unit (GPU) that may be used to implement the techniques of this disclosure.

FIG. 2 is a block diagram illustrating an example configuration of GPU 12 that may be used to implement the techniques for serial processing of this disclosure. GPU 12 is configured to execute instructions for a program in a parallel manner. GPU 12 includes a control unit 72, processing elements 74A-74D (collectively "processing elements 74"), an instruction store 76, a data store 78, and communication paths 80, 82, 84, 86A-86D. Communication paths 86A-86D may be referred to collectively as "communication paths 86." In some examples, GPU 12 may be configured as a single-instruction, multiple-data (SIMD) processing system that is configured to execute a plurality of threads of execution for a program using processing elements 74. In such a SIMD system, processing elements 74 may together process a single instruction at a time with respect to different data items. The program may retire after all of the threads associated with the program complete execution.

Control unit 72 is configured to control GPU 12 to execute instructions for a program stored in instruction store 76. For each instruction of the program, control unit 72 may retrieve the instruction from instruction store 76 via communication path 80, and process the instruction. In some examples, control unit 72 may process the instruction by causing an operation associated with the instruction to execute on one or more of processing elements 74. For example, the instruction retrieved by control unit 72 may be an arithmetic instruction that instructs GPU 12 to perform an arithmetic operation with respect to data items specified by the instruction, and control unit 72 may cause one or more of processing elements 74 to perform the arithmetic operation on the specified data items. In further examples, control unit 72 may process the instruction without causing an operation to be performed on processing elements 74.

Control unit 72 may cause an operation to be performed on one or more of processing elements 74 by providing an instruction to processing elements 74 via communication path 82. The instruction may specify the operation to be performed by processing elements 74. The instruction provided to the one or more of processing elements 74 may be the same as or different than the instruction retrieved from instruction store 76. In some examples, control unit 72 may cause the operation to be performed on a particular subset of processing element 74 (including by a single processing element) by one or both of activating a particular subset of processing elements 74 upon which the operation should be performed and deactivating another subset of processing elements 74 upon which the operation should not be performed. Control unit 72 may activate and/or deactivate processing elements 74 by providing respective activation and/or deactivation signals to each of processing elements 74 via communication path 82. In some examples, control unit 72 may activate and/or deactivate processing elements 74 by providing activation and/or deactivation signals to processing elements 74 in conjunction with providing an instruction to processing elements 74. In further examples, control unit 72 may activate and/or deactivate processing elements 74 prior to providing an instruction to processing elements 74.

Control unit 72 may execute a plurality of threads of execution for a program using processing elements 74. A plurality of threads to be executed in parallel is sometimes called a wave. Each of processing elements 74 may be configured to process instructions of the program for a respective thread of the plurality of threads. For example, control unit 72 may assign each thread of execution to an individual one of processing elements 74 for processing. The threads of execution for the program may execute the same set of instructions with respect to different data items in a set of data items. For example, processing element 74A may execute a first thread of execution for a program stored in instruction store 76 with respect to a first subset of data items in a plurality of data items, and processing element 74B may execute a second thread of execution for the program stored in instruction store 76 with respect to a second subset of data items in the plurality of data items. The first thread of execution may include the same instructions as the second thread of execution, but the first subset of data items may be different than the second subset of data items.

In some examples, control unit 72 may activate and deactivate individual threads in the plurality of threads of execution. When control unit 72 deactivates a thread, control unit 72 may also deactivate and/or disable the processing element 74A-74D that is assigned to execute the thread. Such deactivated threads may be referred to as inactive threads. Similarly, when control unit 72 activates a thread, control unit 72 may also activate the processing element 74A-74D that is assigned to execute the thread. Such activated threads may be referred to as active threads. As will be explained in more detail below, control unit 72 may be configured to select an activate thread to execute a divergent operation (e.g., a serial operation), without needing to consider other active or inactive threads.

As used herein, an active thread may refer to a thread that is activated, and an inactive thread may refer to a thread that is deactivated. For a plurality of threads executing on GPU 12 during a given processing cycle, each of the active threads may be configured to process an instruction of the program identified by a global program counter register for the plurality threads during the processing cycle. For example, control unit 72 may activate processing elements 74 that are assigned to active threads in order to configure such processing elements 74 to process the instruction of the program during the processing cycle. On the other hand, for a plurality of threads executing on GPU 12 during a given processing cycle, each of the inactive threads may be configured to not process the instruction of the program during the processing cycle. For example, control unit 72 may deactivate processing elements 74 that are assigned to inactive threads to configure such processing elements 74 to not process the instruction of the program during the processing cycle.

In some examples, a processing cycle may refer to the time interval between successive loads of the program counter. For example, a processing cycle may refer to the time between when the program counter is loaded with a first value and when the program counter is loaded with a second value. The first and second values may be the same or different values. In examples where the program counter is loaded in an asynchronous manner due to resume check techniques, such asynchronous loads may not, in some examples, serve to differentiate processing cycles. In other words, in such examples, a processing cycle may refer to the time interval between successive synchronous loads of the program counter. A synchronous load of the program counter may, in some examples, refer to a load that is trigged by a clock signal.

Sometime prior to the retrieval of the next instruction, control unit 72 determines a next instruction to be processed by GPU 12. The manner in which control unit 72 determines the next instruction to be processed is different depending on whether the instruction previously retrieved by GPU 12 is a control flow instruction. If the instruction previously retrieved by GPU 12 is not a control flow instruction, then control unit 72 may determine that the next instruction to be processed by GPU 12 corresponds to a next sequential instruction stored in instruction store 76. For example, instruction store 76 may store the instructions for a program in an ordered sequence, and the next sequential instruction may be an instruction that occurs immediately after the previously retrieved instruction.

If the instruction previously retrieved by GPU 12 is a control flow instruction, then control unit 72 may determine the next instruction to be processed by GPU 12 based on information specified in the control flow instruction. For example, the control flow instruction may be an unconditional control flow instruction, e.g., an unconditional branch instruction or a jump instruction, in which case control unit 72 may determine the next instruction to be processed by GPU 12 is a target instruction identified by the control flow instruction. As another example, the control flow instruction may be a conditional control flow instruction, e.g., a conditional branch instruction, in which case control unit 72 may select one of a target instruction identified by the control flow instruction or a next sequential instruction stored in instruction store 76 as the next instruction to process from instruction store 76.

As used herein, a control flow instruction may refer to an instruction that includes information that identifies a target instruction in instruction store 76. For example, the control flow instruction may include a target value indicative of a target program counter value for the control flow instruction. The target program counter value may be indicative of a target address for the target instruction. The target instruction may, in some examples, be different than the next sequential instruction stored in instruction store 76. High-level program code may include control flow statements such as, e.g., if, switch, do, for, while, continue, break, and goto statements. A compiler may translate the high-level control flow statements into low-level, e.g., machine-level, control flow instructions. An instruction that is not a control flow instruction may be referred to herein as a sequential instruction. For example, a sequential instruction may not include information that identifies a target instruction.

For control flow instructions, the information that identifies the target instruction may be a value indicative of a target instruction stored in instruction store 76. In some examples, the value indicative of the target instruction in instruction store 76 may be a value indicative of the instruction address of the target instruction in instruction store 76. The value indicative of the instruction address of the target instruction may, in some cases, be the address of the target instruction in instruction store 76. The value indicative of the instruction address of the target instruction may, in additional cases, be a value used to calculate the address of the target instruction. In further examples, the value indicative of the instruction address of the target instruction may be a value indicative of a target program counter value that corresponds to the target instruction. The value indicative of the target program counter value may, in some cases, be the target program counter value that corresponds to the target instruction. The value indicative of the target program counter value may, in additional cases, be a value used to calculate the target program counter value. The target program counter value that corresponds to the target instruction may, in some examples, be equal to the address of the target instruction.

A control flow instruction may be a forward control flow instruction or a backward control flow instruction. A forward control flow instruction may be a control flow instruction where the target instruction occurs after the control flow instruction in the ordered sequence of instructions stored in instruction store 76. A backward control flow instruction may be a control flow instruction where the target instruction occurs prior to the next sequential instruction in the ordered sequence of instructions stored in instruction store 76. The next sequential instruction may occur immediately after the control flow instruction in the ordered sequence of instructions.

A control flow instruction may be a conditional control flow instruction or an unconditional control flow instruction. A conditional control flow instruction includes information that specifies a condition for jumping to the target instruction associated with the control flow instruction. When processing a conditional control flow instruction, if control unit 72 determines that the condition is satisfied, then control unit 72 may determine that the next instruction to be processed is the target instruction. On the other hand, if control unit 72 determines that the condition is not satisfied, then control unit 72 may determine that the next instruction to be processed is the next sequential instruction stored in instruction store 76. An unconditional control flow instruction does not include information that specifies a condition for jumping to the target instruction associated with the control flow instruction. When processing an unconditional control flow instruction, control unit 72 may unconditionally determine that the next instruction to process is the target instruction identified by the control flow instruction. In other words, the determination in such a case is not conditioned upon any condition specified in the unconditional control flow instruction. As used herein, a condition control flow instruction may be referred to herein as a branch instruction unless the branch instruction is otherwise designated as an unconditional branch instruction. Also, an unconditional control flow instruction may be referred to herein as a jump instruction.

A conditional branch instruction may include conditions that are specified with respect to one or more data item values. For example, one type of condition may be a comparison condition that compares a first data item value to a second data item value for each active thread executing in GPU 12. Comparing the data item values may include, e.g., determining whether the first data item value is greater than, less than, not greater than, not less than, equal to, or not equal to the second data item value. Another type of condition may be a zero check condition that determines whether a data item value for each active thread executing on GPU 12 is equal to or not equal to zero. Because each of processing elements 74 operates on different data items, the result of evaluating the condition may be different for each active thread executing on GPU 12.

If either all of the active threads executing on GPU 12 satisfy the branch condition or all of the active threads executing on GPU 12 do not satisfy the branch condition, then a uniform branching condition occurs and the branching divergence for the threads is said to be uniform. On the other hand, if at least one of the active threads executing on GPU 12 satisfies the branch condition and at least one of the active threads executing on GPU 12 does not satisfy the branch condition, then a divergent branching condition occurs and the branching divergence for the threads is said to be divergent.

One example of a divergent operation is a serial operation. A serial operation (or series of serial operations) is an operation where the output of one thread (e.g., from the serial operation) is needed as the input for one or more other threads. That is other threads may not continue to process in parallel into the output of one or more other threads is completed. In this sense, threads in a SIMD device may perform in serial for a period of time.

Typically, the threads executing on GPU 12 may execute the same instruction in a lockstep fashion. In other words, each of processing elements 74 may together execute the same instruction for all active threads during a processing cycle. However, when a divergent branch condition occurs, the threads that satisfy that branch condition may be scheduled to execute next instructions that are different than the next instructions scheduled to be executed by the threads that do not satisfy the branch condition. As discussed above, one such divergent branch condition may be a serial operation.

Control unit 72 is communicatively coupled to instruction store 76 via communication path 800, to processing elements 74 via communication path 82, and to data store 78 via communication path 84. Control unit 72 may use communication path 800 to send read instructions to instruction store 76. A read instruction may specify an instruction address in instruction store 76 from which an instruction should be retrieved. Control unit 72 may receive one or more program instructions from instruction store 76 in response to sending the read instruction. Control unit 72 may use communication path 82 to provide instructions to processing elements 74, and in some examples, to receive data from processing elements 74, e.g., the result of a comparison instruction for evaluating a branch condition. In some examples, control unit 72 may use communication path 84 to retrieve data items values from data store 78, e.g., to determine a branch condition. Although FIG. 2 illustrates GPU 12 as including a communication path 84, in other examples, GPU 12 may not include a communication path 84.

Each of processing elements 74 may be configured to process instructions for the program stored in instruction store 76. In some examples, each of processing elements 74 may be configured to perform the same set of operations. For example, each of processing elements 74 may implement the same instruction set architecture (ISA). In additional examples, each of processing elements 74 may be an arithmetic logic unit (ALU). In further examples, GPU 12 may be configured as a vector processor, and each of processing elements 74 may be a processing element within the vector processor. In additional examples, GPU 12 may be a SIMD execution unit, and each of processing elements 74 may be a SIMD processing element within the SIMD execution unit.

The operations performed by processing elements 74 may include arithmetic operations, logic operations, comparison operations, etc. Arithmetic operations may include operations such as, e.g., an addition operation, a subtraction operation, a multiplication operation, a division operation, etc. The arithmetic operations may also include, e.g., integer arithmetic operations and/or floating-point arithmetic operations. The logic operations may include operations, such as, e.g., a bit-wise AND operation, a bit-wise OR operation, a bit-wise XOR operation, etc. The comparison operations may include operations, such as, e.g., a greater than operation, a less than operation, an equal to zero operation, a not equal to zero operation, etc. The greater than and less than operations may determine whether a first data item is greater than or less than a second data item. The equal to zero and not equal to zero operations may determine whether a data item is equal to zero or not equal to zero. The operands used for the operations may be stored in registers contained in data store 78.

Each of processing elements 74 may be configured to perform an operation in response to receiving an instruction from control unit 72 via communication path 82. In some examples, each of processing elements 74 may be configured to be activated and/or deactivated independently of the other processing elements 74. In such examples, each of processing elements 74 may be configured to perform an operation in response to receiving an instruction from control unit 72 when the respective processing element 74A-74D is activated, and to not perform the operation in response to receiving the instruction from control unit 72 when the respective processing element 74A-74D is deactivated, i.e., not activated.

Each of processing elements 14A-14D may be communicatively coupled to data store 78 via a respective communication path 86A-86D. Processing elements 74 may be configured to retrieve data from data store 78 and store data to data store 78 via communication paths 86. The data retrieved from data store 18 may, in some examples, be operands for the operations performed by processing elements 74. The data stored to data store 78 may, in some examples, be the result of an operation performed by processing elements 74.

Instruction store 76 is configured to store a program for execution by GPU 12. The program may be stored as a sequence of instructions. In some examples, each instruction may be addressed by a unique instruction address value. In such examples, instruction address values for later instructions in the sequence of instructions are greater than instruction address values for earlier instructions in the sequence of instructions. The program instructions, in some examples, may be machine-level instructions. That is, in such examples, the instructions may be in a format that corresponds to the ISA of GPU 12. Instruction store 76 is configured to receive a read instruction from control unit 72 via communication path 80. The read instruction may specify an instruction address from which an instruction should be retrieved. In response to receiving the read instruction, instruction store 76 may provide an instruction corresponding to the instruction address specified in the read instruction to control unit 72 via communication path 80.

Instruction store 76 may be any type of memory, cache or combination thereof. When instruction store 76 is a cache, instruction store 76 may cache a program that is stored in a program memory external to GPU 12. Although instruction store 76 is illustrated as being within GPU 12, in other examples, instruction store 76 may be external to GPU 12.

Data store 78 is configured to store data items used by processing elements 74. In some examples, data store 78 may comprise a plurality of registers, each register being configured to store a respective data item within a plurality of data items operated on GPU 12. Data store 78 may be coupled to one or more communication paths (not shown) that are configured to transfer data between the registers in data store 78 and a memory or cache (not shown).

Although FIG. 2 illustrates a single data store 78 for storing data used by processing elements 74, in other examples, GPU 12 may include separate, dedicated data stores for each of processing elements 74. GPU 12 illustrates four processing elements 74 for exemplary purposes. In other examples, GPU 12 may have many more processing elements in the same or a different configuration.

Figure 3:
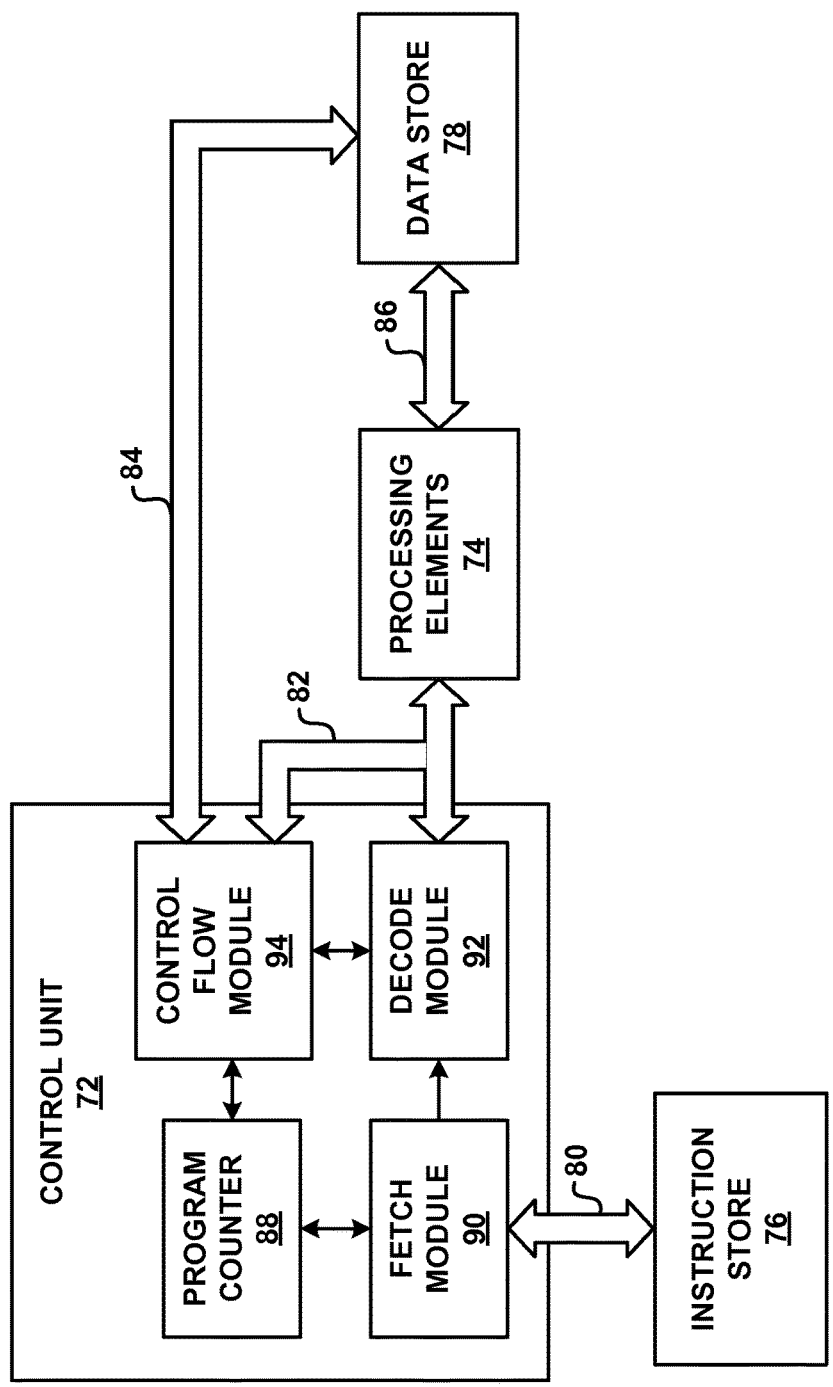
FIG. 3 is a block diagram illustrating the control unit in the example GPU of FIG. 2 in greater detail.

FIG. 3 is a block diagram illustrating control unit 72 in the example GPU 12 of FIG. 2 in greater detail. Control unit 72 includes a program counter 88, a fetch module 90, a decode module 92 and a control flow module 94. Control flow module 94 may be alternatively referred to herein as a control flow unit.

Program counter 288 is configured to store a program counter value. In some examples, program counter 88 may be a hardware register, such as, e.g., a program counter register. The program counter value may be indicative of an instruction stored in instruction store 76. The program counter value may, in some cases, be equal to the instruction address of the instruction stored in instruction store 76. In additional cases, the program counter value may be used to compute the instruction address of the instruction stored in instruction store 76. For example, the program counter value may be added to an offset value to generate the instruction address. Program counter 88 may be referred to herein as a "global program counter" or a "global program counter register" because program counter 88 may be used as a single program counter for all of processing elements 74.

Fetch module 90 is configured to fetch, e.g., retrieve, an instruction from control unit 72 based on the program counter value stored in program counter 88. For example, fetch module 90 may fetch an instruction from an instruction address identified by the program counter value stored in program counter 88. Fetch module 90 may provide the fetched instruction to decode module 92 for further processing.

Decode module 92 is configured to decode the instruction received from fetch module 90. Decoding the instruction may involve determining whether the instruction is a type of instruction that can be processed by processing elements 74. If the instruction is a type of instruction that can be processed by processing elements 74, decode module 92 may cause the instruction to execute on one or more of processing elements 74. In some examples, decode module 92 may cause the instruction to execute on all of processing elements 74. In other examples, decode module 92 may cause the instruction to execute on less than all of processing elements 74. Causing the instruction to execute on one or more of processing elements 74 may, in some cases, include issuing the instruction to one or more of processing elements 74 for execution. For example, fetch module 90 may fetch a sequential instruction identified by program counter 88, and issue the sequential instruction to all processing elements 74 that correspond to active threads for processing. If the instruction is not the type of instruction that can be processed by processing elements 74, then control unit 72 may process the instruction without issuing the instruction to any of processing elements 74 for processing. For example, the instruction may be a control flow instruction of the type that does not require processing by processing elements 74, in which case control unit 72 may process the instruction without issuing the instruction any of processing elements 74.

In either case, decode module 92 may forward control information to control flow module 94 for further processing. In some examples, the control information may be the instruction itself. In further examples, the control information may include information, such as, e.g., information indicative of whether the instruction is a control flow instruction or a sequential instruction; if the instruction is a control flow instruction, information indicative of whether the instruction is a branch instruction or a jump instruction; if the instruction is a branch or jump instruction, information indicative of whether the branch or jump instruction is a forward or backward branch or jump instruction, and if the instruction is a branch instruction, information specifying the branch condition.

Instructions that are of a type that can be processed by processing elements 74 may include arithmetic instructions and logic instructions. An arithmetic instruction may refer to an instruction that instructs processing elements 74 to perform an arithmetic operation, and a logic instruction may refer to an instruction that instructs processing elements 74 to perform a logic operation. In some examples, a control flow instruction may be an instruction that can be processed by processing elements 74, e.g., the control flow instruction may include a branch condition that is evaluated by processing elements 74. Instructions that are not of a type that can be processed by processing elements 74 may include control flow instructions where the branch condition is evaluated by control unit 72 and/or control flow instructions that do not have a branch condition.

Control flow module 94 may determine a program counter value associated with a next instruction to be processed by control unit 72, and load the program counter value into program counter 88. If the previously fetched instruction is a sequential instruction, then control flow module 94 may select a program counter value that is indicative of a next sequential instruction stored in instruction store 76 to load into program counter 88. If the previously fetched instruction is a control flow instruction, then control flow module 94 may utilize resume counter techniques.

Control flow module 94 may store a resume counter value for each thread executing on GPU 12. For example, the number of resume counter values stored in control flow module 94 may be equal to the number of processing elements 74 contained GPU 12. For each resume counter value, if the thread corresponding to the respective resume counter value is inactive, then the resume counter value may be indicative of a program counter value at which the inactive thread should be activated or reactivated. Otherwise, if the thread corresponding to the respective resume counter value is active, then the resume counter value may be, in some examples, set to a maximum value, i.e., a value that is the largest value that can be represented in the storage slot or register for the resume counter.

Control flow module 94 may store an active flag for each thread executing on GPU 12. For example, the number of active flags stored in control flow module 94 may be equal to the number of processing elements 74 contained in GPU 12. Each active flag may indicate whether or not the thread associated with the active flag is active or inactive. In some examples, the active flag may be a single bit that is set to indicate that the thread associated with the active flag is active, and reset to indicate that the thread associated with the active flag is inactive.

In some examples, control flow module 94 may also store a program state. For example, a first program state may indicate that all threads are active, a second program state may indicate that at least on thread is active and at least one thread is inactive and a third program state may indicate that all threads are inactive. The program state may be used in such examples, to select a program counter value to load into program counter 88.

Control flow module 94 may be configured, in some examples, to activate and deactivate one or more of processing elements 74 via communication path 82. In additional examples, control flow module 94 may instruct decode module 92 to activate and deactivate particular processing elements 74. In further examples, control flow module 94 may receive the results of a comparison instruction from one or more of processing elements 74 via communication path 82. The results of the comparison instruction in some examples may be used to evaluate a branch condition. In yet further examples, control flow module 94 may retrieve one or more data items from data store 78, via communication path 84, for purposes of evaluating a branch condition.

As discussed above, within a parallel machine (e.g., a SIMD processing system), there is often the need for performing divergent operations, such as a serialized operation(s). For example, GPU 12 may be instructed to perform a 'prefix sum,' where the input to a given thread(s) executing on processing elements 74 is dependent on the output of another thread executing on processing elements 74.

One conventional approach to performing serialized operations on a SIMD processing system involves using atomic native instructions whereby all threads would compete to perform a lock on a shared variable (i.e., so only one of processing elements 74 has access to the variable at a certain time). However, the use atomic instructions and locks can be inefficient, as they are a limited resource and typically require a long latency for execution.

Another approach for performing a serial operation involves generating unique value for each thread (e.g., a thread id). GPU 12, through control unit 72, would then be configured to loop through all threads, selecting only a single thread (by Thread ID) for each iteration of the loop. Example pseudocode for such an operation is shown below:

```
For (i = 0; i)          // i may represent the total number of threads in
                        a wave
{ if (thread_id == i ) {perform serialized operation} }
```

The above approach requires additional testing and test variables, as well forcing a loop iteration even for those threads that might be inactive. This is both inefficient in resources and time.

In view of these drawbacks, this disclosure proposes techniques for performing serialized operations in a parallel processing system (e.g., a SIMD processing system). In examples below, this disclosure describes an instruction (e.g., a hardware-executed instruction) whereby an active thread from a plurality of threads may be selected to perform a serialized operation, without the need to access any inactive threads.

The solution proposed is in this disclosure is a "GetOne" instruction (GetOne_and_branch( )) that may be executed by control unit 72 of GPU 12. Control unit 72 may configured to select a single active thread out of a plurality of threads (e.g., the threads in wave) for execution. Control unit 72 may determine which threads are currently active using the active flag stored by control flow module 94. Once the single active thread is selected, all other active threads in the wave may execute a branch condition, while the selected thread performs a divergent operation (e.g., the serial operation). The "GetOne" instruction can be then used to execute a serial operation as shown by the following pseudo code:

```
LOOP: GetOne_and_branch TRY_AGAIN
        {perform serialized operation}
        goto CONTINUE
TRY_AGAIN: goto LOOP
```

CONTINUE

In the example above, control unit 72 is initially instructed to go to the LOOP instruction of the code. The LOOP instruction includes the "GetOne" instruction (GetOne_and_branch) that selects a single active thread from a plurality of active threads (e.g., a wave) and proceeds to the serial instruction ({perform serialized operation}) and then exits the control block (goto CONTINUE) and goes inactive. Unselected threads perform the branch instruction of the GetOne_and_branch instruction. In the above example, the branch instruction is a "TRY_AGAIN" instruction, which essentially sends all unselected active threads back to the Loop instruction. Then, another of the remaining active threads may be selected to perform the serialized operation.

The mechanism of the "GetOne" instruction allows for efficient serialization within a wave without additional variables and without requiring a loop iteration for inactive threads. The techniques of this disclosure take advantage of the fact that the parallel threads within a wave already have some level of synchronization due to their shared single instruction. In this way, the "GetOne" instruction of this disclosure allows for one active thread to be selected for serial operation, while simultaneously making all other active threads inactive.

Figure 4:
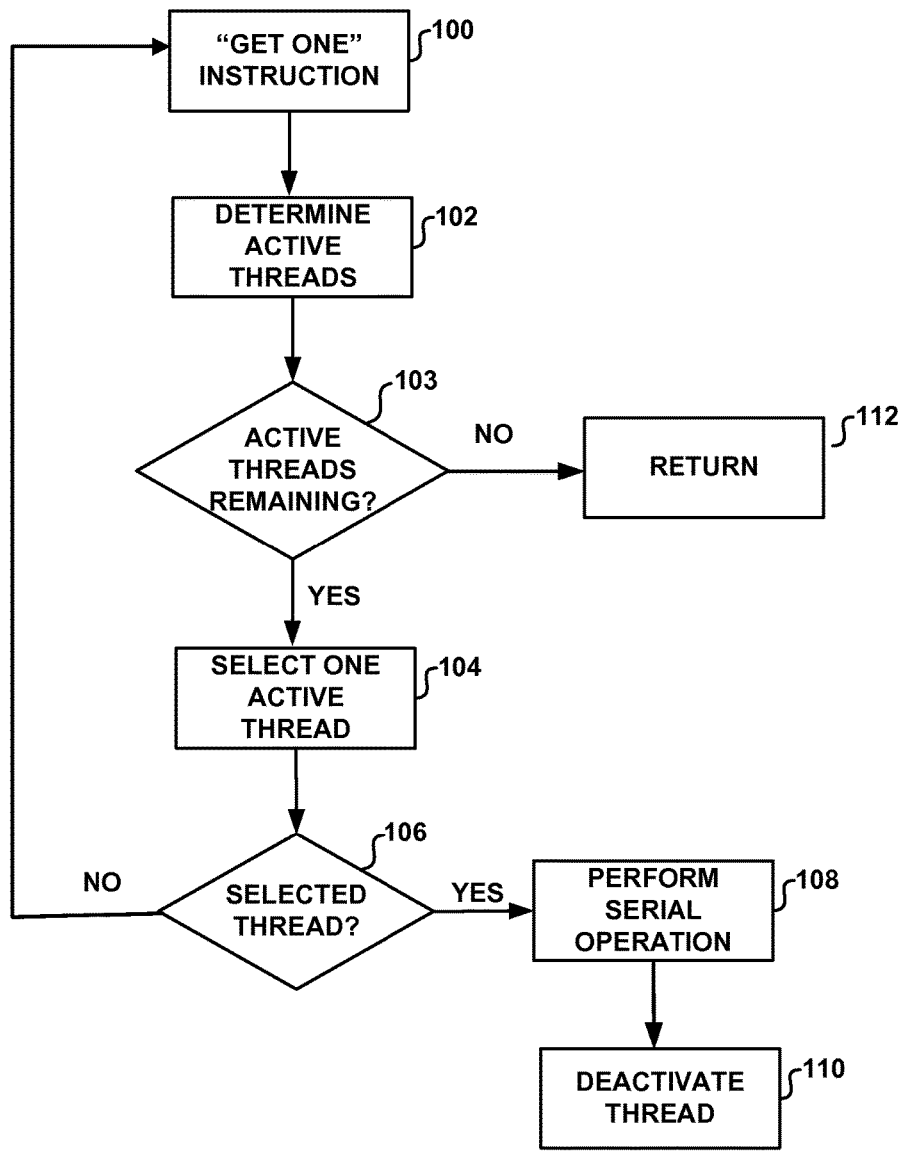
FIG. 4 is a flow diagram showing the serialized operation techniques of this disclosure.

FIG. 4 is a flow diagram showing the serialized operation techniques of this disclosure in more detail. Initially, control unit 72 of GPU 12 may receive a "GetOne" instruction (100). In response to the "GetOne" instruction, control unit 72 is configured to determine which threads in a plurality of threads (e.g., a wave) are active (102). In one example, control unit 72 may be configured to read an active flag associated with each of the threads to determine which threads are active. If control unit 72 determines that no active threads are remaining (103), the control block ends (return 112).

If control unit 72 determines that there are active threads remaining (103), control unit 72 may then select one active thread of the plurality of threads (104). The selected thread (YES of 106) then performs the serial operation (108) on one of processing elements 74. After the serial operation is performed, the selected active thread is deactivated (110). The remaining active threads that are not selected may be looped back to the "Get One" instruction (NO of 106).

GPU 12 configured to execute the "GetOne" instruction for serial execution described above, may also be configured to use the "GetOne" instruction to split a single wave that exhibits divergence into multiple sub-waves, each of which may be uniform. Suppose an example where it is desirable to perform a (possibly divergent) subroutine call. That is, a situation where only a portion of the threads in the wave are to perform the subroutine. One conventional technique for executing a divergent subroutine involves executing each thread uniquely. This may be inefficient.

Instead, GPU 12 may be configured to execute the "GetOne" instruction to store a subroutine in a shared register that may then be executed by all threads having access to the shared register (i.e., processing elements 74 that have access to the shared register). The shared register may be part of data store 78, instruction store 76, or other memory available to processing elements 74.

Using the "GetOne" instruction and the shared register, GPU 12 may be configured to select a subroutine target (i.e., a location where subroutine instructions are stored) using the "GetOne" instruction, broadcast that target to all threads (i.e., provide an indication that a subroutine location is stored in a shared register), and execute the subroutine on all matching threads (i.e., execute the subroutine on processing elements 74 having access to the shared register). This process may then be repeated for other threads having access to different shared registers. Example pseudocode for this process is shown below.

```
LOOP: GetOne_and_branch CONTINUE1
        shared_R0 = subroutine_target //store target in a 'shared' register
CONTINUE1: if (subroutine_target == shared_R0)
        {       call(subroutine_target)
                goto CONTINUE2
        }
goto LOOP
CONTINUE2:
```

Initially, control unit 72 would proceed to the LOOP section of the code and execute the "GetOne" instruction as previously described. The "GetOne" instruction selects one active thread to perform an operation. In the example above, a selected active thread would perform an operation that stores the address of a location (subroutine_target) in a shared register (shared_R0). Any active threads that were not selected would perform the CONTINUE1 operation. In the CONTINUE1 operation, each thread (i.e., processing element 74) having access to shared register shared_R0 executes the code located at subroutine_target and exits the control block at CONTINUE 2. If any non-selected active threads do not have access to the shared register, the non-selected active threads returns to the loop operation, where another sub-routine call may be stored in a different shared register. Again, as with the example of serial operation, any inactive threads are skipped and the minimal number of unique subroutine calls is made.

Figure 5:
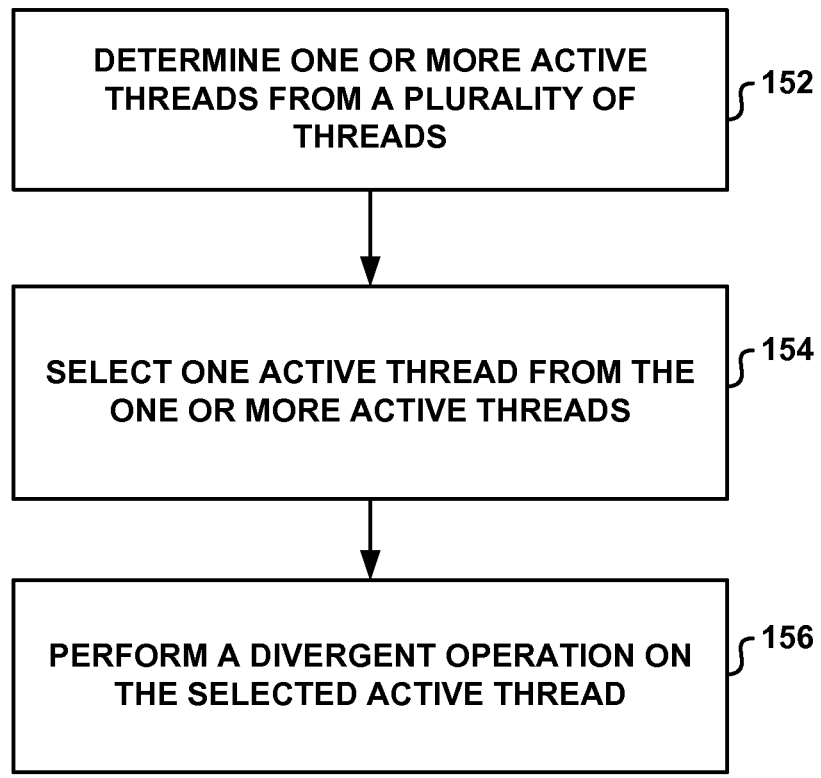
FIG. 5 is a flowchart illustrating an example method of the techniques of this disclosure.

FIG. 5 is a flowchart illustrating an example method of the disclosure. The techniques of FIG. 5 may be implemented by GPU 12, including control unit 72 of GPU 12. In one example of the disclosure, GPU 12 is configured to perform a method of performing divergent operations on a multi-threaded processor. GPU 12 may be configured to determine one or more active threads from a plurality of threads (152), select one active thread from the one or more active threads (154), and perform a divergent operation on the selected active thread (156).

In one example of the disclosure, the multi-threaded processor is a SIMD processor. In another example of the disclosure, the plurality of threads form a wave, wherein the wave is executed by the SIMD processor in parallel.

In another example of the disclosure, GPU 12 is configured to perform the divergent operation on the selected active thread by performing a serialized operation on the selected active thread. In another example of the disclosure, the divergent operation stores a sub-routine target in a shared register, and GPU 12 is further configured to execute code stored at the sub-routine target on the one or more active threads having access to the shared register.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method of performing divergent operations on a multi-threaded processor, the method comprising:
   receiving a loop instruction to perform a divergent operation on the multi-threaded processor;
   determining a plurality of active threads from a plurality of threads of the multi-threaded processor;
   selecting only a single active thread from the determined plurality of active threads;
   performing the divergent operation on the selected single active thread;
   executing a branch instruction on each of the plurality of active threads other than the selected single active thread;
   setting the selected single active thread to inactive; and
   returning, except for the selected single active thread, all other of the plurality of active threads to the loop instruction.

2. The method of claim 1, wherein the multi-threaded processor is a single instruction multiple data (SIMD) processor.

3. The method of claim 2, wherein the plurality of threads forms a wave, and wherein the wave is executed by the SIMD processor in parallel.

4. The method of claim 1, wherein performing the divergent operation on the selected single active thread comprises performing a serialized operation on the selected single active thread.

5. An apparatus configured to perform divergent operations, the apparatus comprising:
   a memory configured to store a loop instruction; and
   a multi-threaded processor in communication with the memory, the multi-threaded processor configured to:
      receive the loop instruction to perform a divergent operation on the multi-threaded processor;
      determine a plurality of active threads from a plurality of threads of the multi-threaded processor;

select only a single active thread from the determined plurality of active threads;

perform the divergent operation on the selected single active thread;

execute a branch instruction on each of the plurality of active threads other than the selected single active thread;

set the selected single active thread to inactive; and return, except for the selected single active thread, all other of the plurality of active threads to the loop instruction.

6. The apparatus of claim 5, wherein the multi-threaded processor is a single instruction multiple data (SIMD) processor.

7. The apparatus of claim 6, wherein the plurality of threads forms a wave, wherein the wave is executed by the SIMD processor in parallel.

8. The apparatus of claim 5, wherein a processing element of the multi-threaded processor associated with the selected single active thread is configured to perform a serialized operation.

* * * * *